United States Patent [19]

Alberts et al.

[11] 4,444,946

[45] Apr. 24, 1984

[54] STABLE, ORGANIC MULTI-COMPONENT DISPERSIONS

[75] Inventors: Heinrich Alberts; Hans Friemann; Hans-Heinrich Moretto, all of Cologne; Hans Sattlegger, Odenthal, all of Fed. Rep. of Germany

[73] Assignee: Bayer Aktiengesellschaft, Leverkusen, Fed. Rep. of Germany

[21] Appl. No.: 344,083

[22] Filed: Jan. 29, 1982

[30] Foreign Application Priority Data

Feb. 14, 1981 [DE] Fed. Rep. of Germany ....... 3105499

[51] Int. Cl.³ .................. C08L 83/06; C08L 83/10
[52] U.S. Cl. .......................... 525/29; 525/63; 525/66; 525/67; 525/101; 525/404; 525/444; 525/445; 525/446; 525/455; 525/464; 525/479; 525/477
[58] Field of Search ................ 525/29, 445, 446, 63, 525/66, 67, 101, 404, 444, 455, 464, 479

[56] References Cited

FOREIGN PATENT DOCUMENTS

| | | |
|---|---|---|
| 349 | 1/1979 | European Pat. Off. . |
| 29947 | 6/1981 | European Pat. Off. . |
| 31887 | 7/1981 | European Pat. Off. . |
| 2142597 | 3/1972 | Fed. Rep. of Germany . |
| 1694973 | 12/1972 | Fed. Rep. of Germany . |
| 2947964 | 6/1981 | Fed. Rep. of Germany ........ 525/29 |
| 2947966 | 7/1981 | Fed. Rep. of Germany . |

*Primary Examiner*—Wilbert J. Briggs, Sr.
*Attorney, Agent, or Firm*—Sprung Horn Kramer & Woods

[57] ABSTRACT

The invention relates to special stable dispersions which crosslink at room temperature upon exposure to moisture in the atmosphere. The dispersions comprise polysiloxanes, vinyl-grafted polysiloxanes and condensation products, e.g. by weight approximately comprising I. 20–90% of at least one diorganopolysiloxane optionally terminated by OH, II. 5–85% of at least one aliphatic or mixed aliphatic-/aromatic polycondensation product or polyaddition product, polyether, or vinyl polymer with a glass temperature $T_G$ of up to 40° C. and/or a vinyl monomer-grafted derivative thereof, and III. 5–85% of at least one organopolysiloxane modified by grafting with at least one vinyl monomer and comprising (A) 10–90% of a diorganopolysiloxane optionally terminated by OH, (B) 10–90% of polymerized units of at least one vinyl compound, and (C) 0–80% of at least one aliphatic or mixed aliphatic/aromatic polycondensation product or polyaddition product, polyether, or vinyl polymer with a glass temperature $T_G$ of up to 40° C.

2 Claims, No Drawings

STABLE, ORGANIC MULTI-COMPONENT DISPERSIONS

The invention relates to stable, organic multicomponent dispersions composed of 1. diorganopolysiloxanes and/or diorganopolysiloxanes terminated by OH,
2. aliphatic or mixed aliphatic/aromatic polycondensation products or polyaddition products, polyethers or vinyl polymers with a glass temperature $T_G$ of up to 40° C. and/or their derivatives modified by grafting with vinyl monomers, and, if appropriate, the corresponding mixtures thereof, and
3. diorganopolysiloxanes and/or diorganopolysiloxanes terminated by OH, which are modified by grafting with vinyl monomers, or graft copolymer dispersions, as obtained by simultaneous grafting of vinyl monomers onto mixtures of diorganopolysiloxanes or diorganopolysiloxanes terminated by OH and the polymers characterized under 2.

The invention preferably relates to dispersions which crosslink at room temperature through environmental moisture, a process for their preparation and the use of these dispersions.

Polymer systems which crosslink at room temperature and are based on organopolysiloxanes are known (see, for example, W. Noll, Chemie and Technologie der Silikone [Chemistry and Technology of the Silicones], Verlag Chemie GmbH, 1968, pages 391 et seq.).

Furthermore, modified organopolysiloxanes can be prepared by various procedures, and these are known. Graft polymers composed of organosiloxanes and vinyl polymers are described, for example, in patent specifications British Patent Specification No. 766,528, British Patent Specification No. 806,582, British Patent Specification No. 869,482 and DE-AS No. (German Published Specification) 1,694,972. The use of organopolysiloxanes with a grafted organic chain and a maximum of 25% of aryl radicals in 1-component or 2-component compositions which harden at room temperature is described in DE-AS (German Published Specification) No. 1,694,973. It is stated that the hydroxypolysiloxanes employed contain up to a maximum of 25% of aryl radicals in every case.

It is further recorded that the grafted organic chain is formed by polymerized units of vinyl monomers, preferably styrene or acrylic esters.

Furthermore, the preparation and use of graft copolymer dispersions for silicone compositions which harden at room temperature is described in U.S. Ser. Nos. 207,033; 207,093 and 207,043, all filed Nov. 14, 1980, Ser. No. 284,295, filed July 17, 1981. These graft copolymer dispersions are characterized in that they contain diorganopolysiloxanes terminated by OH, second polymers, such as, for example, polyesters, polyethers or ethylene/vinyl ester copolymers, and units polymerized in the presence of mixtures of these first polymers and second polymers and composed of vinyl monomers, preferably vinyl acetate, styrene or (meth)acrylic acid derivatives.

Owing to the special polymerization process, these graft copolymer dispersions contain polymer molecules in which the first polymer and the second polymer occur linked via vinyl polymer bridges.

Furthermore, mixtures composed of a non-silicone polymer, for example a polyolefin, olefin copolymers such as ethylene/alkyl acrylate or ethylene/vinyl ester copolymers, and a monoorganopolysiloxane resin are known (DT-OS (German Published Specification) No. 2,832,893). These polymer compositions described in DT-OS (German Published Specification) No. 2,832,893 can be processed from the melt, and are used for coating wires, for example, and have a low oxygen index, but they cannot be used as sealing compositions which harden at room temperature through environmental moisture.

The use of block copolymers or graft copolymers composed of 5 to 95% by weight of a polydiorganosiloxane and 5 to 95% by weight of a vinyl thermoplastic, as the homogenizing agent, for the preparation of a homogeneous mixture of a polydiorganosiloxane and a vinyl thermoplastic is described in DT-AS (German Published Specification) No. 2,142,597, the vinyl thermoplastic quoted being present in a quantity of at least 40% by weight, relative to the total weight of the mixture. The preparation of graft copolymers is always effected with the aid of polyorganosiloxanes with reactive groups which react with the free radicals of the polymerization system. Vinyl groups or 3-mercaptopropyl groups bonded to silicon are examples of such reactive groups. A route for the production of mixtures of the vinyl thermoplastic and a polydiorganosiloxane comprises dissolving the polydiorganosiloxane and, for example, the graft copolymer in the vinyl monomer, and then polymerizing the vinyl monomer. The resulting uniform dispersions of polyorganosiloxanes in the vinyl thermoplastic impart improved processing properties to the vinyl thermoplastic. The use of these mixtures for elastomeric silicone compositions, which are obtained by hardening with atmospheric moisture at room temperature, is not mentioned and was also not practicable with systems of this type.

Aliphatic or mixed aliphatic/aromatic polycondensation products or polyaddition products, polyethers or vinyl polymers with glass temperatures $T_G \leq 40°$ C. are characterized according to the present state of the art by a multitude of possibilities of use in the area of lacquer production, for coating systems, for elastomers or as thermoplastic modifiers, to indicate only a few important possibilities of use.

Furthermore, the outstanding use properties of the silicone elastomers, which are producible in various ways, are also known and need not be individually listed here.

Owing to the incompatibility of these various polymer systems, mixtures of these substance classes are only stable within extremely narrowly restricted limits, and therefore cannot be used in practice.

It was the object of the invention to develop systems which lead to stable mixtures of organopolysiloxanes and second polymers, which can be combined in any desired proportions, as described above.

The object of the invention was, furthermore, to develop silicone compositions which, in addition to improved mechanical properties, are also intended to have an excellent lacquering ability.

The object of the invention was achieved by the preparation of organic multi-component dispersions, which are characterized in that they contain mixtures composed of 1. diorganopolysiloxanes and/or diorganopolysiloxanes terminated by OH
2. aliphatic or mixed aliphatic/aromatic polycondensation products or polyaddition products, polyethers, or vinyl polymers with a glass temperature $T_G \leqq 40°$ C. and/or their derivatives modified by grafting with vinyl monomers, and, if appropriate, their mixtures, 3. diorganopolysiloxanes and/or diorganopolysiloxanes terminated by OH, which are modified by grafting with vinyl monomers, or graft copolymer dispersions, as obtained by simultaneous grafting of vinyl monomers onto mixtures of diorganopolysiloxanes or diorganopolysiloxanes terminated by OH and the polymers characterized under 2.

The invention therefore relates to mixtures composed of

I. 10 to 90% by weight of diorganopolysiloxanes and/or diorganopolysiloxanes terminated by OH II. 5 to 85% by weight of aliphatic or mixed aliphatic-/aromatic polycondensation products or polyaddition products, polyethers, or vinyl polymers with a glass temperature $T_G \leqq 40°$ C. and/or their derivatives modified by grafting with vinyl monomers, and, if appropriate, their mixtures III. 5 to 85% by weight of organopolysiloxanes modified by grafting with vinyl monomers and comprising 1. 10 to 90% by weight of diorganopolysiloxanes and/or organopolysiloxanes with OH functional groups at end positions
2. 10 to 90% by weight of polymerized units of vinyl compounds
3. 0 to 80% by weight of aliphatic or mixed aliphatic-/aromatic polycondensation products or polyaddition products, polyethers, or vinyl polymers with a glass temperature $T_G \leqq 40°$ C., or their mixtures, the sum of the components 1-3 and likewise the sum of the components I to III always being 100% by weight.

The invention particularly relates to mixtures composed of

I. 10 to 90% by weight of organopolysiloxanes with OH functional groups at end positions II. 0 to 40% by weight of organopolysiloxanes with trimethylsilyl end groups III. 5 to 85% by weight of graft polymers comprising 1. 25 to 95% by weight of aliphatic or mixed aliphatic/aromatic polycondensation products or polyaddition products, polyethers, or vinyl polymers with a glass temperature $T_G \leqq 40°$ C., or their mixtures, and
2. 5 to 75% by weight of polymerized units of vinyl monomers, the sum of the components 1-2 always being 100% by weight, IV. 5 to 85% by weight of organopolysiloxanes modified by grafting with vinyl monomers and comprising 1. 10 to 90% by weight of organopolysiloxanes with trimethylsilyl end groups
2. 10 to 90% by weight of polymerized units of vinyl compounds and
3. 0 to 80% by weight of aliphatic or mixed aliphatic-/aromatic polycondensation products or polyaddition products, polyether, or vinyl polymers with a glass temperature $T_G$ 40° C. (cf. M. Hoffmann, H. Krömer, R. Kuhn, Polymeranalytik I, Georg Thieme Verlag, Stuttgart, 1977, pages 73 ff), or their mixtures, the sum of the components I to IV always being 100% by weight.

The invention further relates to mixtures which particularly contain, as the vinyl polymer with a glass temperature $T_G \leqq 40°$ C., vinyl ester homopolymers and copolymers, preferably homopolymers and copolymers of vinyl acetate, (meth)acrylic acid ester homopolymers and copolymers, ethylene polymers, particularly ethylene copolymers with 5 to 99% by weight of incorporated vinyl acetate or ethylene/(meth)acrylic acid ester copolymers or ethylene/propylene copolymers, and also vinyl ether homopolymers and copolymers and also diene homopolymers and copolymers or block copolymers composed of dienes and vinyl aromatics.

The dispersions according to the invention further contain polymerized units of vinyl esters, α, β-unsaturated carboxylic acids, derivatives of α, β-unsaturated monocarboxylic acids or dicarboxylic acids, vinyl aromatics, such as styrene, α-methylstyrene or 4-chlorostyrene, α-olefins, such as ethylene, propylene, but-1-ene or isobutylene, halogenated vinyl monomers, such as vinyl chloride, vinylidene chloride, vinyl fluoride, vinylidene fluoride, tetrafluoroethylene or trifluorochloroethylene, vinyl ethers, such as ethylene vinyl ether or n-butyl vinyl ether, allyl compounds, such as allyl alcohol, allyl acetate, allyl carbonates, diallyl carbonate or diallyl phthalate, divinyl compounds, such as divinylbenzene or divinyl ether, or (meth)acrylic acid esters of polyhydric alcohols or mixtures of these monomers.

The invention furthermore relates to organopolysiloxane compositions which are crosslinkable at room temperature and which contain organic multi-component dispersions and, in addition, crosslinking agents, curing catalysts, fillers and, if appropriate, further additives.

The invention further relates to the use, as one-component or two-component systems for sealing compositions, of organopolysiloxane compositions which are crosslinkable at room temperature and which contain the multi-component dispersions according to the invention.

The preparation of the multi-component dispersions according to the invention is effected by mixing the components under the action of shearing forces, the sequence of addition being arbitrary. The preparation of the mixtures is effected at room temperature or elevated temperatures and preferably under normal pressure.

The organopolysiloxanes with OH functional groups at end positions are essentially linear and are represented by the following formula:

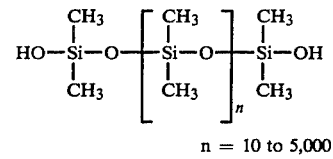

n = 10 to 5,000

In addition to methyl groups, the organopolysiloxane components can contain up to 30 mol % of ethyl groups, vinyl groups and phenyl groups, but methyl-substituted organopolysiloxanes are preferably employed.

The organopolysiloxanes with trimethylsilyl end groups are essentially dimethylpolysiloxanes with a largely linear structure of the following general formula

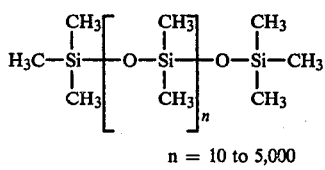

n = 10 to 5,000

In addition to methyl groups, the organopolysiloxane components can contain up to 30 mol % of ethyl groups, vinyl groups, phenyl groups or H-groups, but purely methyl-substituted organopolysiloxanes are preferably used.

The aliphatic or mixed aliphatic/aromatic polycondensation products or polyaddition products are essentially polyesters, polycarbonates, polyurethanes or co-condensation polymers or addition polymers with a static or alternating structure, or block copolymers. The preparation of these polymers is effected by process which are in themselves known, for example according to Houben-Weyl, Methoden der organischen Chemie (Methods of Organic Chemistry), Volume XIV/2, Georg Thieme Verlag, Stuttgart, 1963; C. E. Schildknecht, J. Skeist, Polymerization Processes, Vol. XXIX, John Wiley & Sons, New York, 1977; B. R. 11. Gallot. Adv. in Polymer Sci, Vol. 29, Springer Verlag, Berlin, Heidelberg 1978, page 85 et seq.

The aliphatic or mixed aliphatic/aromatic polyesters which are employed for the preparation of the mixtures or for the graft polymerization or graft copolymerization are prepared in a manner which is in itself known, by an esterification reaction or transesterification reaction of mixtures of aliphatic or aromatic dicarboxylic acids or their anhydrides or esters, and aliphatic dialcohols; see Ullmanns Enzyklopädie der technischen Chemie (Ullmanns Encyclopaedia of Industrial Chemistry), Volume 14, Urban and Schwarzenberg, Munich 1963, page 80 et seq.

Adipic acid, sebacic acid, terephthalic acid, phthalic acid, isophthalic acid, maleic acid, fumaric acid and itaconic acid are preferably employed as dicarboxylic acids; ethylene glycol, propane-1,2-diol, propane-1,3-diol, butane-1,3-diol, butane-1,4-diol, hexane-1,6-diol, 2,2-dimethylpropane-1,3-diol, polyethylene glycols and polypropylene glycols, or polyhydric aliphatic alcohols which contain 2 to 7 ether atoms in the molecule are preferably employed as polyhydric alcohols (see DE-AS (German Published Specification) No. 1,054,620).

Higher-functional carboxylic acids or alcohols are employed for branched polyesters, and glycerol-, 1,1,1-trimethylolpropane, hexanetriol and pentaerythritol may be mentioned (see, for example, German Patent Specification No. 1,105,160 and DE-AS (German Published Specification) No. 1,029,147). The molecular weights of the polyesters are, in general, between 800 and 10,000, but can also be substantially higher, and the OH-numbers are between 0.1 and 150. The residual water contents of the polyesters are, in general, below 0.1%. If desired, special high-molecular polyesters with, for example, a narrower molecular weight distribution can also be employed, the polyesters being obtained by polymerization of lactones, such as, for example, $\beta$-propiolactone, $\gamma$-butyrolactone or $\epsilon$-caprolactone, or the synthesis thereof being effected by copolymerization of epoxides with cyclic anhydrides; see K. Hamann, Makrom. Chem. 51 (1962) 53 and R. F. Fischer, J. Poly. Sci. 44 (1960) 155.

Polycarbonates or mixed ester polycarbonates, which can be obtained by transesterification of polyols or polyesters with, for example, diphenylcarbonate, are also suitable polyesters in the sense of the invention, and butylene glycol polycarbonate and hexane-1,6-diol polycarbonate may be mentioned by way of example. Appropriate purely aliphatic polycarbonates can also be obtained by ring-opening polymerization of, for example, glycol carbonate or by copolymerization of epoxides with carbon dioxide.

The aliphatic polyethers employed for the preparation of the mixture, the graft polymerization and the graft copolymerization have, as a rule, two to eight, preferably two to three, hydroxyl groups, and are prepared, for example, by polymerization of epoxides, such as ethylene oxide, propylene oxide, butylene oxide, tetrahydrofuran, styrene oxide or epichlorohydrin, with themselves, for example in the presence of $BF_3$, or by the addition of these oxides, if appropriate in a mixture of successively, onto starting components with reactive hydrogen atoms, such as alcohols or amines, water, ethylene glycol, propylene-1,3-glycol, propylene-1,2-glycol, trimethylolpropane, 4,4'-dihydroxy-1,3-glycol, 4,4'-dihydroxy-2-glycol, trimethylolpropane, 4,4'-dihydroxydiphenylpropane, aniline, ammonia, ethanolamine or ethylenediamine. Sucrose polyethers, as described, for example, in German Published Specifications Nos. 1,176,358 and 1,064,938, are also suitable according to the invention. Those polyethers which predominantly (up to 90% by weight, relative to all OH groups present in the polyether) have primary OH groups are often preferred. Polyethers which are also modified by vinyl polymers, as formed, for example, by the polymerization of styrene or acrylonitrile in the presence of polyethers (U.S. Pat. Nos. 3,383,351, 3,304,273, 3,523,093 and 3,110,695, and German Patent Specification No. 1,152,536), are likewise suitable, as are polybutadienes which have OH groups.

Among the polythioethers, the condensation products of thiodiglycol with itself and/or with other glycols, dicarboxylic acids, formaldehyde, aminocarboxylic acids or aminoalcohols may be particularly mentioned. According to the co-components, the products are mixed polythioethers, polythioether esters and polythioether ester-amides.

The OH functions of the polycondensation products or polyaddition products used can be acylated, or urethane groups can be introduced by reaction with monoisocyanates, diisocyanates or polyisocyanates, before, during or after the preparation of the mixtures. The acylation can be effected using carboxylic acid halides or carboxylic acid anhydrides. Of course, a transesterification with carboxylic acid esters is also possible. The acylation is preferably carried out using acetic anhydride. The introduction of urethane groups can be carried out, in principle, using the isocyanates known in the art. Phenyl isocyanate, alkyl isocyanates, such as methyl isocyanate, ethyl isocyanate, propyl isocyanate, isopropyl isocyanate or butyl isocyanate, methoxymethyl isocyanate, 1,4-toluylene diisocyanate, 1,2-toluylene diisocyanate, hexamethylene diisocyanate and isophoron diisocyanate are preferred isocyanates.

Vinyl polymers with a glass temperature $T_G \leq 40°$ C. are obtained by the known processes of free radical, anionic, cationic or organometallically initiated polymerization. The polymers are essentially homopolymers, copolymers and block copolymers. The copolymers have random or alternating structures. The block copolymers can be composed of various vinyl monomers, but can also contain blocks composed of polyaddition polymers or polycondensation polymers, for example polyether blocks, polysiloxane blocks, polycarbonate blocks or polyester blocks; see B. R. M. Gallot, Adv. in Polymer Sci., Vol. 29, Springer-Verlag, Berlin, Heidelberg, 1978, page 85 et seq.

In particular, the vinyl polymers with $T_G \leq 40°$ are homopolymers and copolymers of vinyl esters, preferably vinyl acetate, homopolymers and copolymers of (meth)acrylic acid esters, preferably poly-n-butyl acrylate, styrene/n-butyl acrylate polymers, vinyl acetate/n-butyl acrylate copolymers, optionally acrylonitrile copolymers with the vinyl monomers listed, ethylene copolymers, preferably ethylene/vinyl acetate copolymers having 5 to 99% by weight of incorporated vinyl acetate, ethylene/(meth)acrylic acid ester copolymers, ethylene/propylene copolymers or terpolymers, and also vinyl/$C_2$-$C_{18}$-alkyl ether homopolymers and copolymers, for example poly-n-butyl vinyl ether.

The modification by grafting of the polycondensation polymers and polyaddition polymers, the polyethers, the vinyl polymers with $T_G \leq 40°$ C. and the polysiloxanes is effected in a manner which is in itself known, by free radical polymerization of vinyl monomers in the presence of these polymers which have been mentioned, in solution, emulsion, suspension or in bulk. The preparation of the polysiloxanes modified by grafting can be effected, for example, by the processes described in U.S. Pat. Nos. 2,959,569, 4,172,101, 4,166,078, 4,170,610, De-AS Nos. (German Published Specification) 2,000,348, 1,694,973, 1,795,289 and Bulgarian Patent Specification No. 766,528. The preparation of the graft copolymers is effected, as is described in the following text by way of example, by bringing the mixtures composed of an organopolysiloxane, a vinyl polymer with a glass temperature $T_G-40°$ C., an aliphatic or mixed aliphatic/aromatic polyester, polycarbonate or polyester urethane, if appropriate a polyether or polyether-urethane, and one or more vinyl monomers and, if appropriate, monoisocyanates, diisocyanates or polyisocyanates to a reaction temperature at which the free radical polymerization and simultaneously the optional introduction of urethane groups proceeds sufficiently rapidly. If desired, mixtures composed of organopolysiloxanes with terminal OH functional groups and non-functional organopolysiloxanes can be introduced into the reaction mixture. The polymerization can be carried out by a continuous or a discontinuous process. In principle, the sequence of addition of the components to be reacted is arbitrary, but the results are achieved if mixtures of siloxane components and second polymer components and vinyl monomers are simultaneously employed in carrying out the polymerization reaction.

The following may be listed as examples of vinyl monomers which are particularly suitable for the graft reaction: olefins, such as ethylene, propylene or isobutylene, vinyl esters of aliphatic or aromatic carboxylic acids, preferably vinyl acetate or vinyl propionate, $\alpha,\beta$-unsaturated monocarboxylic acids or dicarboxylic acids and their derivatives, (meth)acrylic acid, methyl (meth)acrylate, ethyl (meth)acrylate, propyl (meth)acrylate, isopropyl (meth)acrylate, n-butyl (meth)acrylate, isobutyl (meth)acrylate, tert.-butyl (meth)acrylate, 2-ethylhexyl (meth)acrylate, (meth)acrylamide, N-alkyl-substituted (meth)acrylamide derivatives, (meth)acrylonitrile, maleic acid anhydride, maleic acid amides, N-alkyl maleimide, maleic acid half-esters or diesters, vinyl aromatics, such as styrene, $\alpha$-methylstyrene or 4-chlorostyrene, vinyl chloride, vinylidene chloride, vinylidene fluoride, tetrafluoroethylene, vinyl ethers, such as ethyl vinyl ether or n-butyl vinyl ether being mentioned; from the series comprising allyl compounds, allyl alcohol, allyl acetate, isobutene diacetate, 2-methylenepropane-1,3-diol, allyl ethyl carbonate and allyl phenyl carbonate may be mentioned. If crosslinking or an increase in the molecular weight of the vinyl resin phase is desired, polyunsaturated vinyl compounds or allyl compounds can be employed. Divinylbenzene, (meth)acrylates of polyhydric alcohols, for example ethylene glycol dimethacrylate, diethylene glycol diacrylate and divinyl ether may be mentioned.

The organopolysiloxane mixed dispersions obtained according to the invention are particularly suitable for use in 1-component compositions and 2-component compositions which cure at room temperature. Such compositions, which cure according to the condensation principle, consist, as is known, of polydiorganosiloxanes which are blocked at the ends by hydroxyl, crosslinking agents, fillers and catalysts.

The polydiorganosiloxanes which are blocked at the ends by hydroxyl can be completely or partly replaced by the mixtures according to the invention. Silanes containing, in the molecule, at least 3 groups which can readily be split off by hydrolysis, such as carboxylic acids, carboxylic acid amides, oximes, amine oxides and amines, are employed as crosslinking agents. Reinforcing fillers are, for example, pyrogenically produced silicon dioxides, and chalk, for example, is a suitable non-reinforcing filler. Organic tin compounds, such as dibutyl-tin dilaurate, are used, inter alia, as catalysts.

Silicone compositions in which the multicomponent polysiloxane dispersions according to the invention are used show, in comparison to the silicone compositions hitherto known, a substantially improved property with respect to painting over with commercial varnishes which are based, for example, an alkyd resins or polyurethanes. The silicone compositions, which have cured at room temperature and in which the graft copolymers according to the invention are contained as constructive constituents can be varnished like wood. Furthermore, excellent adhesion is found for these novel systems, even under wet conditions, on wood, metals and concrete.

The examples which follow illustrate the preparation of the polysiloxane mixed dispersions according to the invention.

Preparation of the starting substances

The preparation of the polydimethylsiloxanes, and also of the OH-functional polysiloxanes, occurs in a manner which is in itself known (see, for example, W. Noll, Chemie und Technologie der Silikone (Chemistry and Technology of the Silicones), Verlag Chemie GmbH, Weinheit/Bergstr., 2nd edition, 1968, chapter 5, page 162 et seq.)

| Polysiloxane No. | Description | Viscosity mPas at 20° C. |
|---|---|---|
| 1 | Polydimethylsiloxane | 1,000 |
| 2 | OH polysiloxane | 5,000 |
| 3 | OH polysiloxane | 10,000 |

| Polysiloxane No. | Description | Viscosity mPas at 20° C. |
|---|---|---|
| 4 | OH polysiloxane | 50,000 |

The preparation of the polyesters (see Table 1) is effected by condensation in the melt, while the water of reaction formed is distilled off until the desired OH number or acid number is reached (see Houben-Weyl, Methoden der Organischen Chemie (Methods of Organic Chemistry), Volume XIV/2, Georg Thieme-Verlag, Stuttgart, 1963, page 1 et seq.). The most important characteristic data of the polyethers used are summarized in Table 2:

TABLE 1

| Designation of the polyester | Composition | OH number | Acid number |
|---|---|---|---|
| A | Adipic acid/ diethylene glycol | 40 | 1 |
| B | Adipic acid, diethylene glycol, acetic acid | 1 | 1 |
| C | Adipic acid, ethylene glycol, butane-1,4-diol | 55 | 1 |

TABLE 2

| Polyether | Composition | Characteristic data |
|---|---|---|
| A | Polyethylene glycol MW approximately 1,500 | Melting point: 58–60° C.: OH number: approximately 5 |
| B | Polyethylene glycol MW approximately 6,000 | |
| C | Polyethylene glycol MW approximately 20,000 | |
| D | Trifunctional mixed polyether composed of propylene oxide and ethylene oxide | Viscosity 520 mPas |
| E | Polyether D acetylated with acetic anhydride | OH number <1 |

Preparation of the graft polymer

Graft polymer: 1–4

The components given in Table 3 are heated to 110° C. under nitrogen in a 6 l stirred vessel, while stirring. The mixture is then further stirred for 1 hour at 110° C. The volatile portions are removed by vacuum distillation. The mixture is cooled and the viscosity of the end product is measured at 25° C.

TABLE 3

| Graft polymer No. | Poly- siloxane 1 | Polyether A | Polyether B | Polyether C | Vinyl acetate | Styrene | n-Butyl acrylate | tert.-Butyl acrylate | tert.-Butyl perpivalate |
|---|---|---|---|---|---|---|---|---|---|
| 1 | 1980 | 990 | — | — | 1540 | — | — | — | 11.5 |
| 2 | 1980 | — | 990 | — | 1540 | — | — | — | 11.5 |
| 3 | 1800 | — | — | 900 | — | — | 1200 | 240 | 9.75 |
| 4 | 2400 | — | — | 1200 | — | 400 | 800 | 200 | 10.5 |

The conversion of the monomer is about 90% in all mixtures. The viscosities of the mixtures are

| Graft polymer No. | Viscosity at 25° C. in mPas |
|---|---|
| 1 | 14,500 |
| 2 | 19,700 |
| 3 | 15,200 |
| 4 | 8,200 |

TABLE 4

| Graft polymer No. | Polysiloxane 2 | Polysiloxane 3 | Polyether E | Polyester A | Polyester C | Vinyl acetate | Monomer conversion % by weight | Viscosity at 25° C. in mPas |
|---|---|---|---|---|---|---|---|---|
| 5 | 1900 | — | 1000 | — | — | 1100 | 96.8 | 60,600 |
| 6[1] | 13000 | — | — | 6500 | — | 6500 | 90.3 | 30,000 |
| 7[1] | 12381 | — | — | 6941 | — | 8442 | 96.0 | 80,800 |
| 8[1] | — | 13000 | — | 6500 | — | 6500 | 98.5 | 60,000 |
| 9[2] | — | 28780 | — | — | 14390 | 14390 | 93.0 | 56,600 |

[1]Mixtures in 40 l stirred vessel
[2]Mixture in 100 l stirred vessel

Graft polymer 10

2.9 kg of polysiloxane 3 are initially introduced into a 6 l stirred vessel and warmed to 110° C. while nitrogen is passed over. A solution of 100 g of polysiloxane 3, 2.25 g of tert.-butyl perpivalate and 1 kg of vinyl acetate is then added to the polysiloxane during the course of 2 hours, and the mixture is then further stirred for 1 hour at 110° C. The conversion of monomer is 98.1%. After the volatile portions have been removed, the dispersion has a viscosity of 22,500 mPas.

Graft polymer 11 to 13

The polyesters given in Table 5 are initially introduced under nitrogen in a 6 l stirred vessel, heated to 110° C. under nitrogen, and the vinyl acetate/initiator mixture is added during the course of 2 hours, while stirring. The mixture is further stirred for 1 hour at 110° C. and unreacted vinyl acetate is then stripped off in vacuo.

TABLE 5

| Graft polymer No. | Polyester A | Polyester B | Vinyl acetate | tert.-Butyl perpi- valate | % by weight monomer conversion | Viscosity at 25° C. in mPas |
|---|---|---|---|---|---|---|
| 11 | — | 3000 | 1000 | 2.25 | 94.4 | 51,500 |
| 12 | 3000 | — | 1000 | 2.25 | 96.1 | 23,000 |
| 13 | 2000 | — | 2000 | 9.0 | 98.7 | 92,000 |

Graft polymer 14 to 16

The components listed in Table 6 are initially introduced into a 6 l stirred vessel and warmed to 110° C. under nitrogen, and the vinyl acetate/initiator mixture is added at 110° C. during the course of 2 hours. The mixture is further stirred for 2 hours at 110° C. The volatile portions are then distilled off in vacuo at 110° C. After the polymer has been cooled, the viscosity is measured at 25° C.

TABLE 6

| Graft polymer | Polyester A | Polyether D | Hexamethylene diisocyanate | Vinyl acetate | tert. butyl perpivalate | Viscosity at 25° C. in mPas |
|---|---|---|---|---|---|---|
| 14 | 2400 | 600 | 120 | 1000 | 2.25 | 30,000 |
| 15 | 3000 | — | 120 | 1000 | 2.25 | 75,000 |
| 16 | 2400 | 600 | 120 | 1350 | 3.0 | 40,000 |

The conversion of monomer is about 90% in all cases.

Preparation of the mixtures

Unless otherwise indicated, the mixtures are prepared by stirring at room temperature (stirring time 1 hour). The composition of the mixtures according to the invention is given in the table below. The data are in % by weight.

TABLE 7

| Example No. | Polysiloxane 4 | Graft polymer No. 1 | 2 | 11 | 14 | 15 | 16 | Viscosity at 25° C. in mPas |
|---|---|---|---|---|---|---|---|---|
| 1 | 30 | 50 | — | 20 | | | | 66,000 |
| 2 | 30 | — | 50 | 20 | | | | 125,000 |
| 3 | 33.3 | — | 47.8 | 18.9 | | | | 85,000 |
| 4 | 40 | — | 42.2 | — | 17.8 | | | 82,000 |
| 5 | 40 | — | 42.2 | — | — | 17.8 | | 79,000 |
| 6 | 40 | — | 42.2 | — | — | — | 17.8 | 81,000 |

Example 7

The following components are stirred in a 6 l stirred vessel for 2 hours at 110° C., and a polyester urethane is prepared simultaneously during the mixing by reacting the polyester A with hexamethylene diisocyanate: 1,800 g of polysiloxane 4, 1,800 g of graft polymer 2, 800 g of polyester A and 80 g of hexamethylene diisocyanate. After the polymer has cooled to room temperature, the viscosity is 86,000 mPas.

EXAMPLES 8–22

The mixtures listed in Table 8 are prepared by stirring the components at room temperature.

Determination of the quality of the dispersions

The compositions prepared by the process described in this text were mixed according to the following recipe, with the aid of crosslinking agents and catalysts which promote the crosslinking, and were cured under the action of atmospheric moisture: 200 g of graft copolymer 10.4 g of a titanium complex of the following approximate composition:

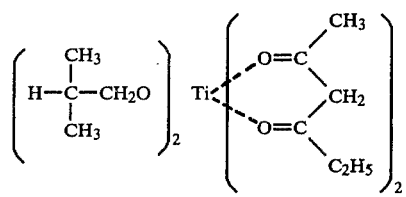

11.4 g of bis-(N-methylbenzamido)-ethoxymethylsilane
2.2 g of dibutyl-tin diacetate The crosslinked products are elastic and free from tackiness. They were painted with a commercial alkydal varnish, the adhesion of which on the silicone was determined after 7 days with the aid of the cross-hatch test by cutting a square of 2.54 cm on the varnished surface into 100 square pieces of equal size with a razor blade, so that a painted surface with a cross-hatch-like appearance is obtained. An adhesive tape (Tesafilm No. 101 of Beiersdord AG, Hamburg) is then firmly pressed onto this cross-hatch. The adhesive tape is then removed from the surface by slowly pulling it off at an angle of about 30° C. The percentage value for the retention of the varnish is obtained from the number of painted square pieces which remain on the cured preparation after the removal of the adhesive tape. The physical properties and the results of the cross-hatch test are evident from Table 9 which follows. Polydimethylsiloxanes blocked at the ends with hydroxyl and with a viscosity of 5 Pas in Example A and 50 Pas in Example B were employed for the comparison Examples A and B.

TABLE 9

| Comparison Example No. | Varnish flow | Varnish adhesion % | E-module (100% elongation) N/mm² | Tensile strength N/mm² | Elongation at break % |
|---|---|---|---|---|---|
| A | poor | 0 | 0.141 | 0.299 | 295 |
| B | poor | 18 | 0.097 | 0.313 | 544 |

TABLE 8

| Example No. | Polysiloxane 2 | 3 | 4 | Graft polymer 2 | 3 | 5 | 6 | 7 | 8 | 9 | 10 | 12 | 13 | Polyester A | C | Polyether D | Viscosity at 25° C. in mPas |
|---|---|---|---|---|---|---|---|---|---|---|---|---|---|---|---|---|---|
| 8 | | | | | | | | | | | 50 | 50 | | | | | 65,000 |
| 9 | | | | | | | | | | 66.7 | 33.3 | | | | | | 45,000 |
| 10 | | | 25 | | | 50 | | | | | | | | 25 | | | 30,300 |
| 11 | | | 25 | | | 50 | | | | | | | | | | 25 | 25,500 |
| 12 | | | 25 | | | | 50 | | | | | | | | 25 | | 40,400 |
| 13 | | | 25 | | | | | 50 | | | | | | 25 | | | 42,400 |
| 14 | | | 30 | | | 50 | | | | | | | | 20 | | | 12,400 |
| 15 | | | 30 | | | 50 | | | | | | | 20 | | | | 12,900 |
| 16 | | 25 | | | | | | 50 | | | | | | 25 | | | 58,600 |
| 17 | | 25 | | | | | | | 50 | | | | | | | 25 | 34,000 |
| 18 | | 30 | 50 | | | | | | | | | 20 | | | | | 67,000 |

TABLE 10

| Example No. | Varnish flow | Varnish adhesion % | E-module (100% elongation) N/mm² | Tensile strength N/mm² | Elongation at break % |
|---|---|---|---|---|---|
| 1 | good | 100 | 0.070 | 0.217 | 571 |
| 2 | good | 100 | 0.055 | 0.184 | 528 |
| 3 | good | 77 | 0.053 | 0.220 | 718 |
| 4 | good | 58 | 0.102 | 0.360 | 1017 |
| 5 | good | 84 | 0.091 | 0.390 | 739 |
| 6 | good | 99 | 0.038 | 0.246 | 977 |
| 7 | good | 99 | 0.070 | 0.224 | 477 |
| 8 | good | 76 | 0.18 | 0.54 | 460 |
| 9 | good | 83 | 0.26 | 0.67 | 410 |
| 10 | good | 88 | 0.092 | 0.309 | 645 |
| 11 | good | 84 | 0.05 | 0.172 | 632 |
| 12 | good | 83 | 0.139 | 0.303 | 407 |
| 13 | good | 88 | 0.169 | 0.355 | 369 |
| 14 | good | 71 | 0.069 | 0.170 | 542 |
| 15 | good | 66 | 0.036 | 0.131 | 591 |
| 16 | good | 92 | 0.186 | 0.350 | 355 |
| 17 | good | 97 | 0.056 | 0.128 | 431 |
| 18 | good | 99 | 0.123 | 0.345 | 851 |

It will be understood that the specification and examples are illustrative but not limitative of the present invention and that other embodiments within the spirit and scope of the invention will suggest themselves to those skilled in the art.

We claim:

1. A process for the preparation of a dispersion approximately comprising by weight
   I. 10–90% of at least one diorganopolysiloxane,
   II. 5–85% of at least one aliphatic or mixed aliphatic/aromatic polycondensation product or polyaddition product, polyether, or vinyl polymer with a glass temperature $T_G$ of up to 40° C. and/or a vinyl monomer-grafted derivative thereof, and
   III. 5–85% of at least one organopolysiloxane modified by grafting with at least one vinyl monomer and comprising
      (A) 10–90% of a diorganopolysiloxane,
      (B) 10–90% of polymerized units of at least one vinyl compound, and
      (C) 0–80% of at least one aliphatic or mixed aliphatic/aromatic polycondensation product or poly-addition product, polyether, or vinyl polymer with a glass temperature $T_G$ of up to 40° C.,
   comprising mechanically agitating, until a largely homogeneous composition which does not separate again has formed,
   (a) at least one organopolysiloxane modified by grafting with at least one vinyl monomer and comprising
      (i) at least one organopolysiloxane with trimethylsilyl end groups,
      (ii) polymerized units of at least one vinyl compound, and
      (iii) at least one aliphatic or mixed aliphatic/aromatic polycondensation product or polyaddition product, polyether, or vinyl polymer with a glass temperature $T_G$ of up to 40° C.,
   (b) at least one organopolysiloxane with OH or trimethylsilyl end groups, and
   (c) at least one aliphatic or mixed aliphatic/aromatic polycondensation product or polyaddition product, polyether or vinyl polymer with a glass temperature $T_G$ of up to 40° C. and/or a vinyl monomer-grafted derivative thereof, (i), (ii), (iii), (a), (b) and (c) being combined in the necessary proportions to produce a dispersion of the indicated composition.

2. A process according to claim 1 wherein (i), (ii), (iii), (a), (b) and (c) are combined in proportions such that the resulting dispersion approximately comprises by weight
   I. 10–90% of at least one organopolysiloxane optionally terminated by OH,
   II. 5–85% of at least one graft polymer comprising
      (A) 25–95% of at least one aliphatic or mixed aliphatic/aromatic polycondensation product or polyaddition product, polyether, or vinyl polymer with a glass temperature $T_G$ of up to 40° C., and
      (B) 5–75% of polymerized units of at least one monomer,
   III. 5–85% of at least one organopolysiloxane modified by grafting with at least one vinyl monomer, and comprising
      (A) 10–90% of at least one organopolysiloxane with trimethylsilyl end groups,
      (B) 10–90% of polymerized units of at least one vinyl compound, and
      (C) 0–80% of at least one aliphatic or mixed aliphatic/aromatic polycondensation product or polyaddition product, polyether, or vinyl polymer with a glass temperature $T_G$ of up to 40° C. and
   IV. 0–40% of at least one organopolysiloxane with trimethylsilyl end groups.

* * * * *

UNITED STATES PATENT AND TRADEMARK OFFICE
CERTIFICATE OF CORRECTION

PATENT NO. : 4,444,946
DATED : April 24, 1984
INVENTOR(S) : Heinrich Alberts et al It is certified that error appears in the above-identified patent and that said Letters Patent is hereby corrected as shown below:

Col. 1, line 39 — Delete "1,694,972" and substitute --1,694,973--

Col. 2, line 39, Col. 3, line 1, Col. 3, line 18, Col. 3, line 31, Col. 3, line 44, Col. 3, line 64, Col. 6, line 65, Col. 7, line 10 and Col. 7, line 25 — After "$T_G$" delete "$\leqq$" and substitute --$\leq$--

Col. 5, line 20, 21 — Delete "process" and substitute --processes--

Col. 8, line 42 — Delete "an" and substitute --on--

Col. 10, Before Table 4 — Insert --Graft polymer 5-9

The graft copolymer dispersions 5-9 with the composition given in Table 4 are prepared on the basis of the process described under 1-4 :--

Col. 12, line 2 — Delete "process" and substitute --processes--

Signed and Sealed this

Ninth Day of October 1984

[SEAL]

Attest:

Attesting Officer

GERALD J. MOSSINGHOFF

Commissioner of Patents and Trademarks